Oct. 25, 1938.　　　　A. E. PAGE　　　　2,134,669
AUTOMATIC APPARATUS FOR WEIGHING MATERIAL FLOWING IN A CONTINUOUS STREAM
Filed Feb. 26, 1937　　　　4 Sheets-Sheet 1

Inventor:— Alfred Ernest Page.
Per:— George E. Folkes.
Attorney.

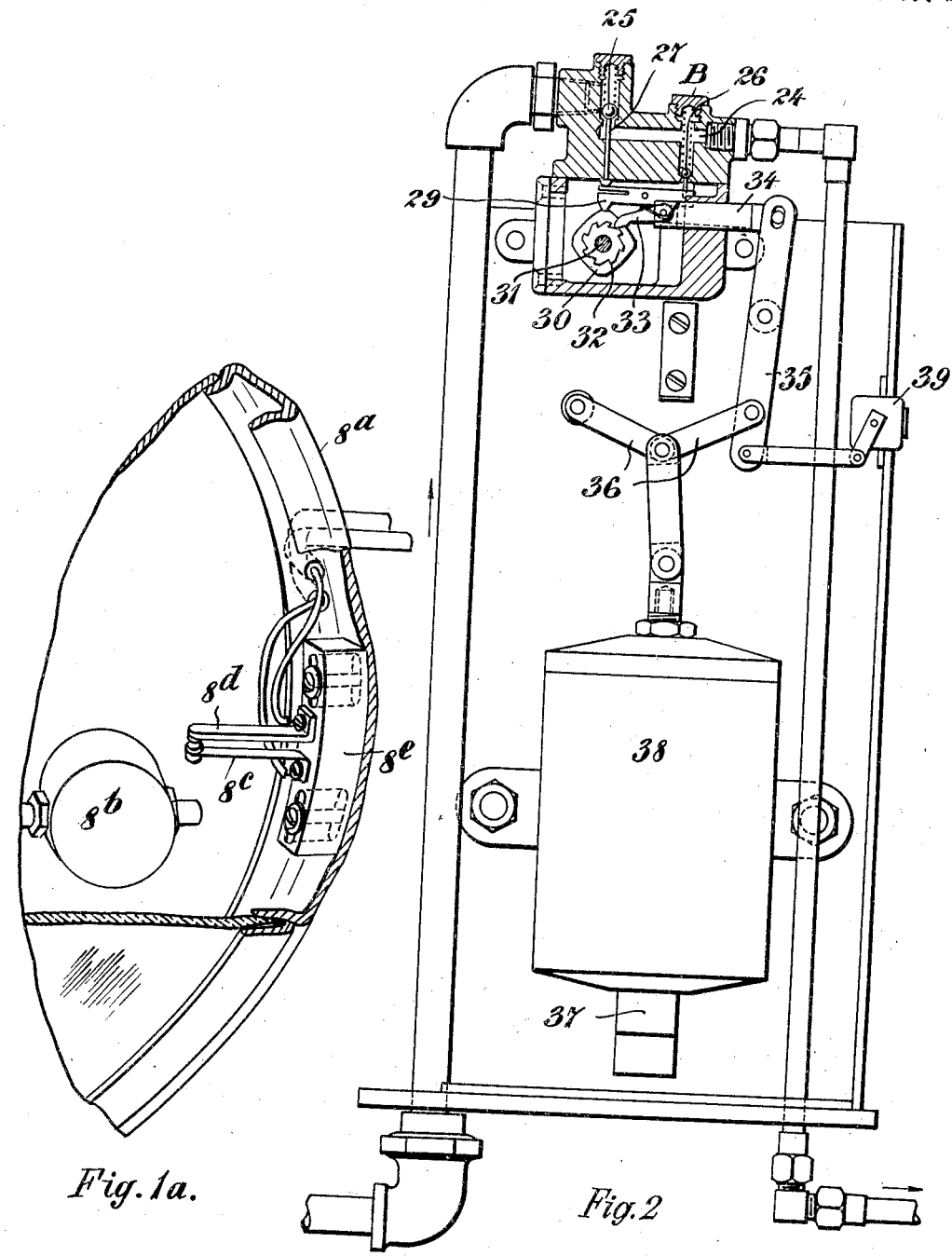

Oct. 25, 1938.  A. E. PAGE  2,134,669
AUTOMATIC APPARATUS FOR WEIGHING MATERIAL FLOWING IN A CONTINUOUS STREAM
Filed Feb. 26, 1937   4 Sheets-Sheet 3
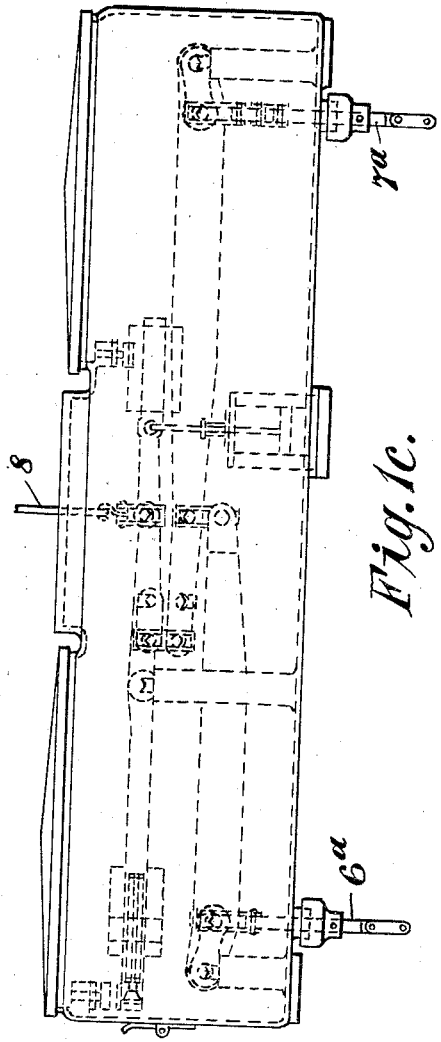
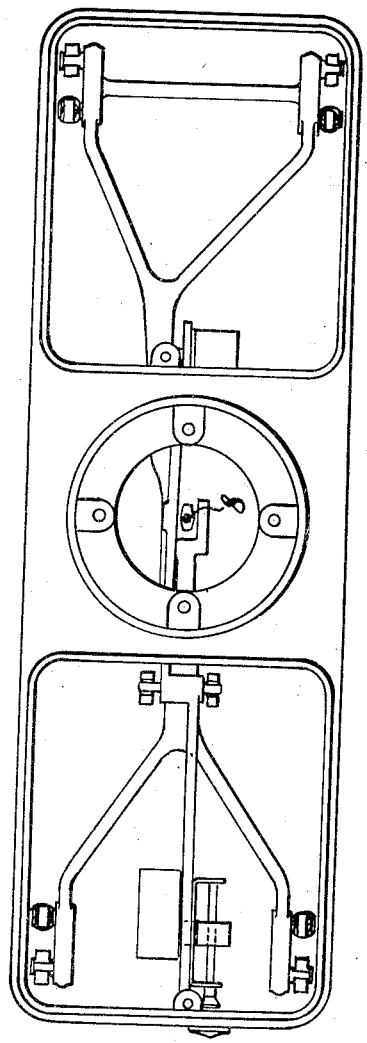
Inventor:- Alfred Ernest Page.
Per:- George E. Jolkes
Attorney.

Oct. 25, 1938.  A. E. PAGE  2,134,669
AUTOMATIC APPARATUS FOR WEIGHING MATERIAL FLOWING IN A CONTINUOUS STREAM
Filed Feb. 26, 1937  4 Sheets-Sheet 4

Inventor:- Alfred Ernest Page.
Per:- George E Folkes.
Attorney.

Patented Oct. 25, 1938

2,134,669

UNITED STATES PATENT OFFICE 2,134,669

AUTOMATIC APPARATUS FOR WEIGHING MATERIAL FLOWING IN A CONTINUOUS STREAM

Alfred Ernest Page, Birmingham, England, assignor to W. & T. Avery Limited, Birmingham, England Application February 26, 1937, Serial No. 127,902
In Great Britain March 5, 1936

5 Claims. (Cl. 249—26)

This invention has reference to improvements in automatic apparatus for weighing material flowing in a continuous stream and is concerned more particularly with weighing apparatus for the said purpose of the kind in which the stream of material to be weighed is diverted alternately into one or other of a pair of vessels provided with discharge valves so that while one vessel and its contents is being filled and weighed the other vessel is discharging.

The present invention has for its object the provision of an improved apparatus of the aforesaid kind, which provides for a positive actuation of the control mechanism.

The invention consists of an improved automatic weighing apparatus for weighing materials flowing in a continuous stream of the kind hereinbefore referred to, in which the operation of the mechanism for controlling the discharge of material from the weighing vessels and for diverting the feed is effected by fluid pressure under the governance of means the operation of which is controlled by a part of the weighing or weight indicating mechanism.

A convenient embodiment of the invention will now be described with particular reference to the accompanying sheets of drawings which illustrate the invention in its application to an automatic weighing apparatus particularly suited for weighing milk which flows from a source of supply in a continuous stream.

In the drawings:—

Figure 1a is a fragmentary view on an enlarged scale of the control mechanism which is governed by the weight indicating mechanism.

Figure 1b is a fragmentary view in side elevation showing in dotted lines the lever system from which the weighing vessels are suspended.

Figure 1c is a plan of Figure 1b with parts of the casing removed so as to show the method of arranging and mounting the lever system.

Figure 2 is a front elevation of the control mechanism.

Like numerals of reference indicate similar parts in the several views.

Figure 1:
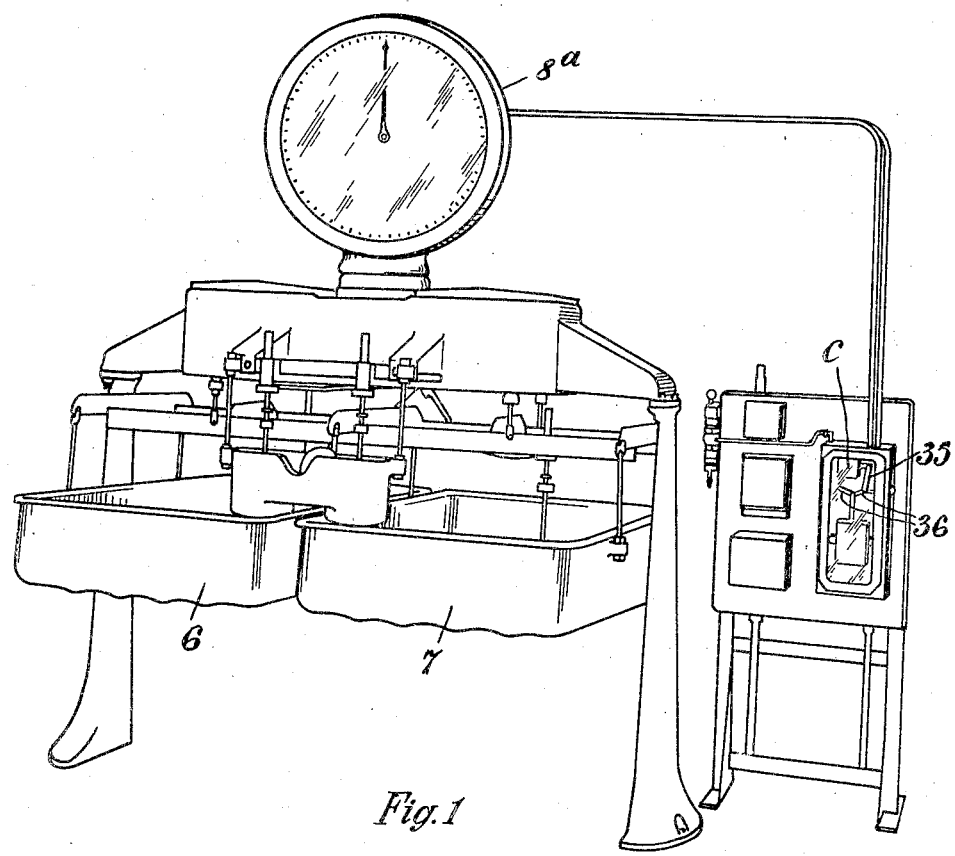
Figure 1 is a perspective view of the improved milk weighing apparatus.
Figures 4, 5:
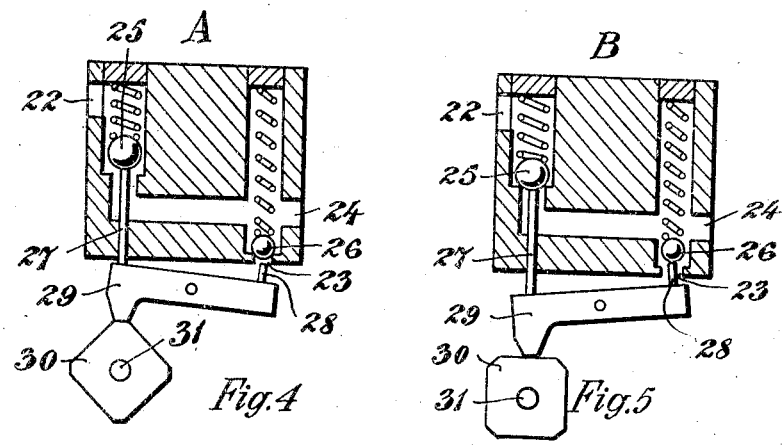
Figure 4 is a diagrammatic view illustrating the pneumatic valve setting when the left hand vessel is filling.
Figure 5 is a similar view showing the corresponding setting of the other pneumatic valve mechanism.
Figure 3:
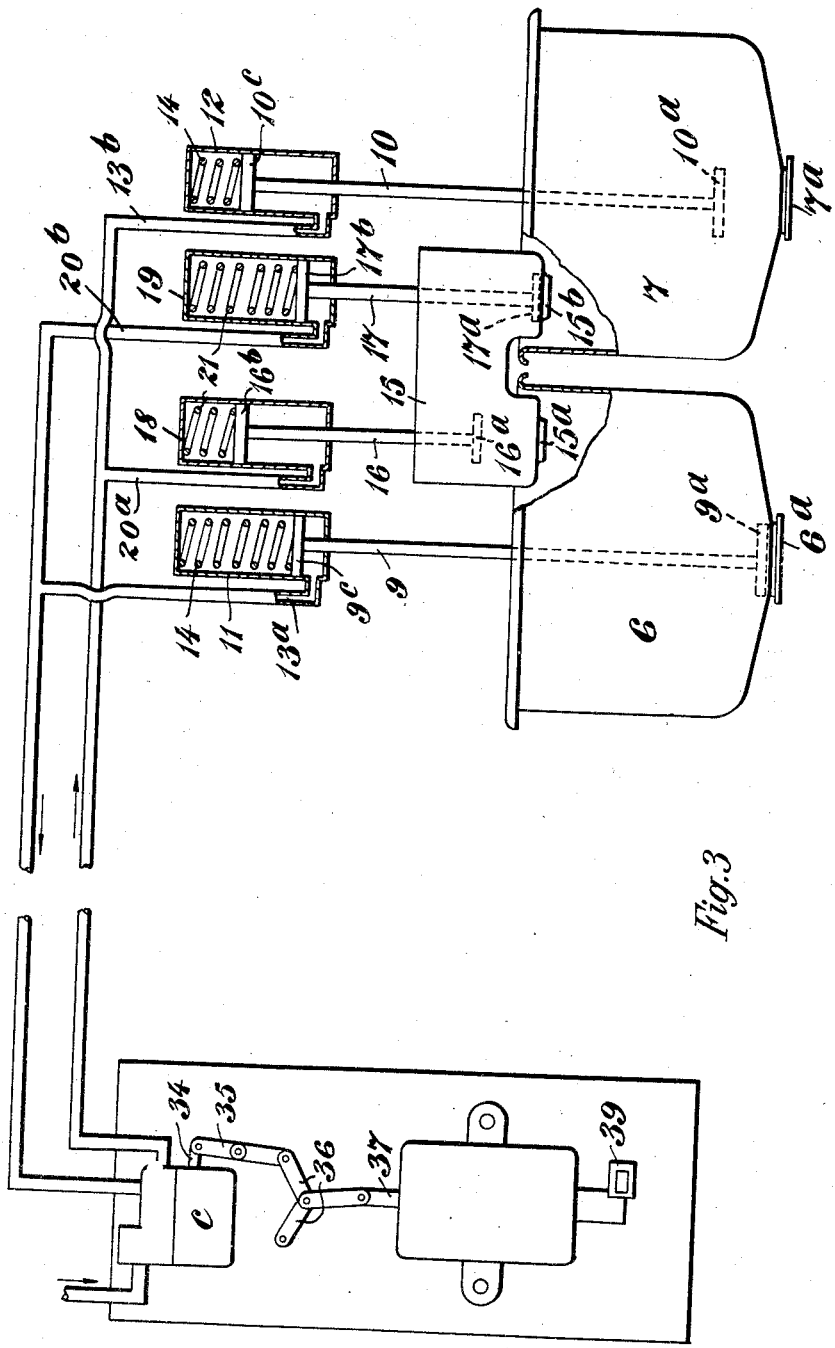
Figure 3 is a diagrammatic view illustrating more clearly the general lay-out and method of operation.

According to the embodiment of the invention illustrated the improved weighing apparatus incorporates a pair of vessels 6 and 7 of stainless steel which are suspended by rods 6ᵃ, 7ᵃ from a lever system see Figures 1b and 1c which in turn is connected by a rod 8 to a weighing apparatus of known kind embodying a visible weight indicating mechanism of the kind described and claimed in the United States patent specification No. 1,672,143 which is contained within a casing 8ᵃ. Each of the weighing vessels 6 and 7 is provided in the lower end with an outlet 6ᵃ, 7ᵃ and the said outlets 6ᵃ, 7ᵃ are disposed above a common reception vessel (not shown) from which the weighed quantities of milk flow to the required points for treatment. The outlets 6ᵃ and 7ᵃ are controlled by discharge valves 9ᵃ and 10ᵃ which are connected by means of rods 9 and 10 to pistons 9ᶜ, 10ᶜ disposed within cylinders 11, 12 the lower ends of which are in communication with a source of compressed air by way of pipe lines 13ᵃ, 13ᵇ. Interposed between the pistons 9ᶜ, 10ᶜ and the closed ends of the cylinders 11, 12 are coil springs 14 so that the discharge valves 9ᵃ and 10ᵃ tend to remain closed under the combined action of gravity and of the said springs 14. The liquid is directed into the weighing vessels 6 and 7 from a common supply vessel 15 which straddles the weighing vessels 6 and 7 and which is provided with a pair of outlets 15ᵃ, 15ᵇ one of which is located above the weighing vessel 6 and the other above the weighing vessel 7. These outlets 15ᵃ, 15ᵇ are controlled by valves 16ᵃ, 17ᵃ carried at the lower ends of piston rods 16, 17 the upper ends of which are connected to pistons 16ᵇ, 17ᵇ which work within cylinders 18, 19 which are connected with a source of compressed air by way of pipelines 20ᵃ, 20ᵇ. Coil springs 21 are interposed between the pistons 16ᵇ, 17ᵇ and the ends of the cylinders so that the valves 16ᵃ and 17ᵃ tend to close under the combined action of gravity and the said springs. The pipe lines 13ᵃ and 20ᵇ are connected to a common pipe line leading to a pneumatic control valve A whereas the pipe lines 13ᵇ and 20ᵃ are connected to a common pipe line leading to a pneumatic control valve B. These pneumatic control valves A and B are similar in construction and arranged side by side in a casing C. The aforesaid pneumatic control valves A and B each comprise a body block having therein a passage 22 communicating with the compressed air supply pipe and with an outlet to atmosphere by way of a vent 23 and with an outlet to the respective pipe line by way of a branch 24. The passages 22 are controlled by spring controlled ball valves 25 and the vents 23 by spring controlled ball valves 26. The springs normally maintain the valves 25, 26 closed and the said valves are opened as required by rods 27, 28 through the agency of levers 29. The noses of these levers 29 cooperate with a pair of cam discs 30 of a substantially rectangular shape arranged on a rotatable spindle 31 the cam discs 30 being disposed so that the peaks of the cams on the one disc 30 are arranged at angles of forty-five degrees to the peaks of the cams on the other disc 30. Fixed on the spindle 31 carrying the cam discs 30 and interposed between the said discs 30 is a ratchet wheel 32 the teeth whereof co-operate with a pawl 33 carried by a link 34 which has a pivotal connection at one end to a lever 35 which is connected through a toggle linkage 36 to the armature 37 of an electro-magnetic device. The circuit through the solenoid 38 of the electro-magnetic device is completed when one of the pendulum levers 8ᵇ of the weight indicating mechanism moves into engagement with the movable contact 8ᶜ and presses the contact into engagement with the fixed contact 8ᵈ. The contacts 8ᶜ and 8ᵈ are carried by a block 8ᵉ which has an adjustable pin and slot connection with the casing 8ᵃ whereby the said block 8ᵉ may be set so that the contacts 8ᶜ and 8ᵈ complete the circuit through the solenoid 38 whenever a predetermined weight is attained by the weight indicating mechanism.

The lever 35 is caused to actuate a counter 39 or said counter 39 may be operated by the armature 37 as indicated in Figure 2.

The operation of the invention is as follows:—
The adjustable block 8ᵉ is set at a point on the dial casing 8ᵃ of the indicating mechanism corresponding to the weight of liquid which is to be fed into each of the weighing vessels 6 and 7 alternately. As weighing proceeds whenever the pendulum lever 8ᵇ comes into engagement with the movable contact 8ᶜ the circuit through the solenoid 38 is completed whereby the armature 37 through the toggle linkage 36 moves the lever 35 connected thereto and through the pawl 33 carried by the link 34 connected to the said lever 35 effects a rotation of the ratchet wheel 32 one tooth. This rotation of the ratchet wheel 32 causes the peak on one or other of the cam discs 30 to contact with the nose of its valve control lever 29 and so to lift one valve 25 and allow the other valve 26 to close the vent 23 the nose of the other valve control lever 29 falling in the gap between the peaks of the two discs 30 whereby the valve 25 of the other valve is caused to close and the vent 23 to be opened. By means of these valves A and B air is diverted alternately from one pair of interconnected pneumatic cylinders 12, 18, 11, 19 to the other so that the discharge valves 9ᵃ and 10ᵃ are opened alternately and the supply valves 16ᵃ and 17ᵃ operated correspondingly.

The circuit is broken upon the return of the indicator pointer 8ᵃ towards the zero position immediately a change over has taken place.

It will be appreciated that an improved weighing apparatus constructed as hereinbefore described provides for a positive actuation of the control mechanism which ensures an efficient operation of the apparatus.

Although the invention has been described in its application to an apparatus for weighing liquid it is to be understood that it is equally applicable to weighing other materials which are capable of a free flow.

What I claim is:—

1. An automatic weighing apparatus for weighing materials flowing in a continuous stream embodying in combination a single weighing mechanism, a pair of weighing vessels common to and suspended from said weighing mechanism and adapted for alternate filling and discharging operations, valve controlled outlets from said weighing vessels, a supply means, common to both weighing vessels, a pneumatically operated means for controlling the said supply means and which is associated also with the valve controlled outlets, a cam mechanism, a single electrical means controlled by the weighing mechanism and which is brought into operation at the completion of each weighing operation and caused to effect a step rotation of the cam mechanism, and valve gear actuated by said cam mechanism for controlling the pneumatically operated means and which at each operation thereof causes the outlet of the filled weighing vessel to be opened pneumatically and the supply means to be diverted likewise to the complementary weighing vessel.

2. An automatic weighing apparatus for weighing materials flowing in a continuous stream embodying in combination a single weighing mechanism, a pair of weighing vessels common to and suspended from said weighing mechanism and adapted for alternate filling and discharging operations, valve controlled outlets from said weighing vessels, a supply means common to both weighing vessels, a pneumatically operated means for controlling the said supply means and which is associated also with the valve controlled outlets, a cam mechanism, an electrical circuit, an electrical contact means included in said circuit which closes the electrical circuit when a predetermined weight is registered by the weighing mechanism, an electro-magnetic device which is energized when the circuit is closed, means actuated by the electro-magnetic device for imparting a stepped rotation to the cam mechanism and a valve gear actuated by said cam mechanism for controlling the pneumatically operated means and which at each operation thereof causes the outlet of the filled weighing vessel to be opened pneumatically and the supply means to be diverted likewise to the complementary weighing vessel.

3. An automatic weighing apparatus according to claim 2, wherein the electro-magnetic device includes an armature and wherein the means for imparting a stepped rotation to the cam mechanism includes a linkage and ratchet and pawl mechanism which is actuated by said armature.

4. An automatic weighing apparatus according to claim 1, wherein the valve gear incorporates a pair of pneumatic valves arranged side by side and wherein the cam mechanism incorporates a pair of cams adapted to effect the actuation of said valve, the peaks of the aforesaid pair of cams being arranged at angles of forty-five degrees to one another.

5. An automatic weighing apparatus for weighing materials flowing in a continuous stream embodying a frame, a lever system mounted in said frame, a weight indicating mechanism connected to said lever system, a pair of weighing vessels suspended from said lever system, valve controlled outlets from said weighing vessels, a pneumatic means for effecting the opening of said outlets, a supply means common to both weighing vessels, pneumatic means for diverting the supply to one or other of the said weighing vessels, a cam mechanism, an electrical means controlled by the weighing mechanism for imparting a step rotation to the cam mechanism at the completion of each weighing operation and pneumatic valves for controlling the said pneumatic means and which are operated by the cam mechanism and which are arranged to effect the control of the pneumatic means so that when a weighing operation is completed the valve outlet of the filled weighing vessel is opened, the valve outlet to the empty weighing vessel closed and the supply means diverted from the filled weighing vessel to the empty weighing vessel.

ALFRED ERNEST PAGE.